No. 633,759. Patented Sept. 26, 1899.
L. HIRT.
CLOSING DEVICE FOR FILTER PRESSES.
(Application filed June 2, 1899.)
(No Model.)
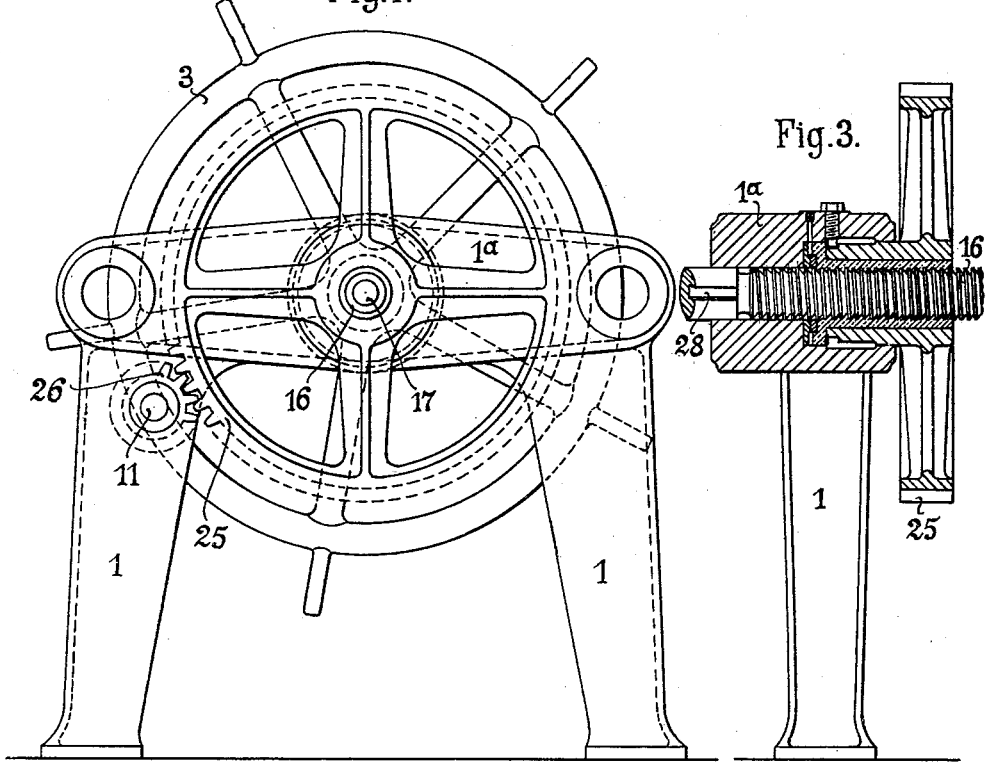
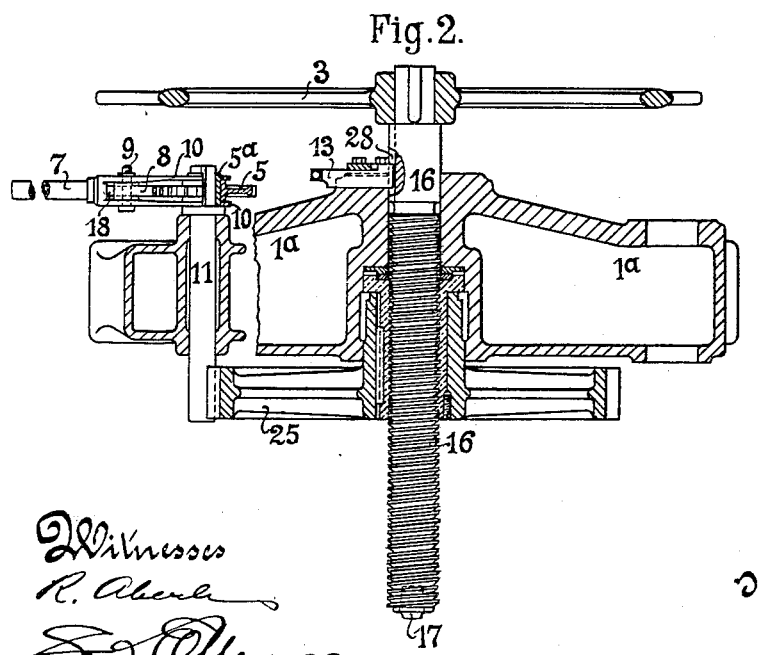

UNITED STATES PATENT OFFICE.

LUDWIG HIRT, OF GREVENBROICH, GERMANY, ASSIGNOR TO THE MASCHINENFABRIK GREVENBROICH, OF SAME PLACE.

CLOSING DEVICE FOR FILTER-PRESSES.

SPECIFICATION forming part of Letters Patent No. 633,759, dated September 26, 1899.

Application filed June 2, 1899. Serial No. 719,064. (No model.)

*To all whom it may concern:*

Be it known that I, LUDWIG HIRT, a subject of the King of Prussia, Emperor of Germany, and a resident of Grevenbroich, Kingdom of Prussia, German Empire, have invented a certain new and useful Improvement in Closing Devices for Filter-Presses, of which the following is a specification.

The object of the herein-described invention is to provide filter-presses with a joint-closing device which can be readily operated and which shall close the joints between the plates so effectually that they shall be liquid-tight under the greatest practical internal hydraulic pressures, which hitherto has been difficult or impossible of accomplishment, particularly where the filter plates or frames or plates and frames have considerable area. In such case a single pressure-spindle is unavailing, even with the usual assistance of a long lever.

In the accompanying drawings, Figure 1 is an end view, Fig. 2 a horizontal section, and Fig. 3 a longitudinal section, the latter of a part, of the closing device.

The joint-closing device which I claim as my invention, and desire to secure by Letters Patent, consists, essentially, as follows: Through the center of the bridge-piece or connecting cross-piece 1ª, between the end stands or framings 1 and passing through a nut therein, there is led the spindle 16. This latter is throughout most of its length provided with a male thread and at that one of its ends next the filter-press has a pin or gudgeon 17, which by the drawing of the spindle takes against the end plate of the press. On the other or unthreaded end of the spindle there is keyed a hand-wheel 3. Between the end framing 1 and the filter-plates the gear-wheel 25 is movably attached on the spindle. Its hub or the tight bushing therein has in its bore a female thread, in which the threaded spindle 16 plays.

At the end framing in order to periodically prevent the spindle from turning there is also a movable bolt 13, that can engage in a slot 28, provided in that end of the spindle which is not threaded.

The movement of the spur gear-wheel 25 is effected by a ratchet-and-pawl device, which will be described later on. In this gear-wheel there engages a pinion 26, which is fast on a shaft 11, passing through the end framing 1 and having a bearing therein. This shaft outside of the framing carries a ratchet-wheel 5 removably, being preferably, although not necessarily, of prismatic four-square section. The shaft may be otherwise formed to receive the ratchet-wheel, the essential thing being that the ratchet-wheel shall be easily placed thereon and easily removed therefrom. The manner of the connection is inessential. This ratchet device consists of a ratchet-wheel 5, the hub of which fits over the preferably four-sided portion of the said shaft 11 or has a tight bushing 5ª with a corresponding orifice. The hub 5 or the bushing 5ª is prolonged, and on the prolongation there is a movable fork 10, which straddles the ratchet-wheel and which ends in a lever-arm 7. In the crotch of this fork 10 there is a pawl 8, pivoted upon a bolt 9, which is fast in the crotch or between the fork-jaws. This pawl 8 engages into the ratchet-teeth of the wheel 5. The spring 18 serves to hold the pawl 8 against the teeth of the ratchet-wheel 5. This entire ratchet device can be readily slid on and off the four-square part of the shaft 11.

The manipulation of the before-described joint-closing device is as follows: In closing the filter-press first the spindle 16 (the bolt 13 having been withdrawn therefrom) is by means of the hand-wheel screwed up as tight as possible against the end plate of the press. Then the bolt 13 is again inserted in the spindle-end slot, so that the splindle 16 will be prevented from turning. Next by means of an alternate forward-and-backward movement of the fork 10 the ratchet-wheel 5 is turned by the pawl 8, and this movement is communicated through the shaft 11 and the pinion 26 to the spur-wheel 25. Then by reason of the male thread of the spindle engaging the female thread of the spur-wheel hub the spindle is driven powerfully forward against the loose end plate of the filter-press. The very considerable leverage of the before-described mechanism and the spur-gear and pinion combination renders easy the thorough and absolute tight closing of the joints between the filter-plates against any liquid leakage, even under the greatest attainable internal hydraulic pressure.

The opening of the filter-press is effected by removing the ratchet-wheel and its attachments from the spindle 11 and placing it on the same in a reverse position and using the parts to effect the withdrawal of the spindle in the opposite direction to that adopted to close the plates together. The bolt is then withdrawn from the spindle-slot and the latter fully run back by means of the hand-wheel. It is obvious that one ratchet device, as described, in its easily-removable connection with the spindle 11 may serve for a battery or a large number of corresponding filter-presses in order to impart to said filter-presses the finishing high-closing pressure or to relieve such numerous presses from said pressure.

I claim—

1. In a device for firmly closing the joints between the plates or frames of the filter-press, the combination of an end framing, a female-threaded spur gear-wheel 25 provided with a hub movably mounted in the said end framing, a threaded pressure-spindle 16 passing through the said female-threaded hub, with means for rotating the pressure-spindle 16 to exert a certain preparatory pressure on the end plate of the system of filter plates or frames and a locking device for locking the pressure-spindle from rotation, combined with means for causing the final efficient pressure of the spindle against the plates or frames consisting of a pinion 26 meshing with the spur gear-wheel 25, a shaft 11 carrying the said spindle, with means for imparting rotation to the said spindle, comprising a ratchet-wheel 5, a pawl 8 engaging the said ratchet-wheel and a fork-end lever 10 carrying the pawl.

2. In a filter-press-joint-closing apparatus, the combination of means for effecting the initial pressure, comprising a female-threaded hub carrying a gear-wheel and a screw-pressure spindle 16 passing therethrough, of means for causing the efficient final pressure and for relaxing the said efficient final pressure, comprising a spindle 11, a pinion 26 carried thereon and gearing with the gear-wheel, a reversible pawl-and-ratchet device carried by the said spindle but readily removable therefrom and replaceable thereon in a reverse position, whereby the said pawl-and-ratchet device may be actuated when in one position to cause rotation of the shaft 11 to effect rotation of the gear-wheel and its screw-hub to bring about the final efficient pressure and by reversing the position of the pawl-and-ratchet device on the shaft 11, the final pressure may be eased or relieved in the same manner.

3. In a device for firmly closing the joints between the plates or frames of the filter-press, the combination of an end framing, a female-threaded spur gear-wheel 25 provided with a hub movably mounted in the said end framing, a threaded pressure-spindle 16 passing through the said female-threaded hub, with means for rotating the pressure-spindle 16 to exert a certain preparatory pressure on the end plate of the system of filter plates or frames and a locking device for locking the pressure-spindle from rotation, combined with means for exerting the final efficient pressure, comprising a shaft 11 having a pinion 26 gearing with the gear-wheel 25, a ratchet-wheel 5 removably secured to the shaft 11, a fork 10 straddling the ratchet-wheel and pivotally secured to the said shaft, a pawl 8 pivoted on a bolt 9 in the jaws of the said fork and a spring 18 pressing the said pawl against the teeth of the ratchet-wheel 5.

4. In a device for firmly closing the joints between the plates or frames of a filter-press, the combination of an end frame, a spur gear-wheel 25 having a hub movably arranged in the end framing and with a female thread, a threaded pressure-spindle 16 passing through the end framing and working in the female thread and provided with means for rotating the said spindle and for locking it from rotation at predetermined times, whereby rotation of the said spindle will cause the same to be fed forward in the hub to exert the initial pressure upon the filter-press and means for exerting the final and efficient pressure, comprising means for rotating the gear-wheel when the pressure-spindle has been locked from rotation, whereby rotation of the said gear-wheel will, by means of the threaded hub, thrust the spindle forward without rotating the same.

In testimony that I claim the foregoing as my invention I have signed my name, in presence of two witnesses, this 13th day of May, 1899.

LUDWIG HIRT.

Witnesses:
HERNANDO DE SOTO,
CARL KNOOP.